United States Patent
Chisholm et al.

(10) Patent No.: US 8,014,296 B1
(45) Date of Patent: Sep. 6, 2011

(54) METHOD AND APPARATUS FOR ENABLING LCAS-LIKE FEATURE THROUGH EMBEDDED SOFTWARE

(75) Inventors: David E. Chisholm, Petaluma, CA (US); Ji Wen, Cary, NC (US); Charles A. Carriker, Jr., Cary, NC (US); Jim P. Ervin, Raleigh, NC (US); Sanjeev D. Rampal, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1257 days.

(21) Appl. No.: 10/814,878

(22) Filed: Mar. 31, 2004

(51) Int. Cl.
- G01R 31/08 (2006.01)
- G06F 11/00 (2006.01)
- G08C 15/00 (2006.01)
- H04J 1/16 (2006.01)
- H04J 3/14 (2006.01)
- H04L 1/00 (2006.01)
- H04L 12/26 (2006.01)
- H04L 12/28 (2006.01)
- H04L 12/56 (2006.01)
- H04J 3/00 (2006.01)

(52) U.S. Cl. .......... 370/241.1; 370/395.5; 370/476
(58) Field of Classification Search .......... 370/230, 370/241, 389, 392, 394, 395.5, 431, 465, 370/474, 475, 476, 241.1
See application file for complete search history.

(56) References Cited

U.S. PATENT DOCUMENTS

| | | | |
|---|---|---|---|
| 5,491,686 A * | 2/1996 | Sato | 370/223 |
| 6,118,791 A | 9/2000 | Fichou et al. | |
| 6,345,051 B1 | 2/2002 | Gupta et al. | |
| 6,539,427 B1 | 3/2003 | Natarajan et al. | |
| 6,631,134 B1 | 10/2003 | Zadkian et al. | |
| 6,633,545 B1 | 10/2003 | Milbrandt | |
| 6,654,923 B1 * | 11/2003 | Grenier et al. | 714/752 |
| 6,665,273 B1 | 12/2003 | Goguen et al. | |
| 6,697,373 B1 * | 2/2004 | Sandstrom | 370/405 |
| 6,965,612 B2 * | 11/2005 | Chohan et al. | 370/465 |
| 6,977,889 B1 * | 12/2005 | Kawaguchi et al. | 370/228 |
| 2003/0112833 A1 * | 6/2003 | Kamiya | 370/535 |
| 2004/0213268 A1 * | 10/2004 | Gupta et al. | 370/395.51 |
| 2004/0213299 A1 * | 10/2004 | Gupta et al. | 370/539 |
| 2004/0252633 A1 * | 12/2004 | Acharya et al. | 370/216 |
| 2005/0047419 A1 * | 3/2005 | Green | 370/395.51 |
| 2005/0147081 A1 * | 7/2005 | Acharya et al. | 370/351 |

OTHER PUBLICATIONS

Hernandez-Valencia E., "Hybrid Transport Solutions for TDM/Data Networking Services", IEEE Computing Magazine, p. 104-112, published in May 2002.*

Generic Framing Procedure (GFP): The Catalyst for Efficient Data over Transport; Emerging Data over SONET/SDH (DoS) Standards and Technology; by Paul Bonenfant and Antonio Rodriguez-Moral, Photuris, Inc.; May 2002; IEEE.*

Framing Techiques for IP over Fiber; by Paul Bonenfant and Antonio Rodriguez-Moral, Photuris, Inc.; Jul./Aug. 2001, IEEE.*

(Continued)

Primary Examiner — Xavier Szewai Wong
(74) Attorney, Agent, or Firm — Cesari and McKenna, LLP

(57) ABSTRACT

A technique controls the capacity of a virtual concatenation group (VCG) carried on a SONET path of a data network. Efficient control of VCG capacity is provided by emulating aspects of a Link Capacity Adjustment Scheme (LCAS) protocol in software. A hardware poller facility is employed to manage the status and state of the VCG, as well as members belonging to the VCG. The hardware poller contains one or more VCG state machines (VSMs) and member state machines (MSMs) configured to maintain the status and states of the VCGs and their members.

20 Claims, 13 Drawing Sheets

OTHER PUBLICATIONS

Malis et al, "SONET/SDH Circuit Emulation over Packet (CEP)" in PWE3 Working Group, Jun. 2002, retrived from http://tools.ietf.orgpdfdraft-malis-pwe3-sonet-03.pdf.*

SONET Telecommunications Standard Primer, Tektronix, Inc., (c) 2001, pp. 1-35.

Link Capacity Adjustment Scheme (LCAS) for Virtual Concatenanted Signals, ITU-T G.7042/Y.1305, available from Internet Telecommunication Union (ITU), Geneva, Switzerland, Oct. 2001, pp. 1-22.

A. Mukhopadhyay, et al., Understanding Virtual Concatenation and Link Capacity, Adjustment Scheme in SONET/SDH, CMP Communications Conference, 2003, pp. 1-12.

Matthew Coakeley, Virtual Concatenation: Knowing the Details, Part 1, CommsDesign, CMP Media, LLC, Nov. 12, 2002, pp. 1-7.

Matthew Coakeley, Virtual Concatenation: Knowing the Details, Part 2, CommsDesign, CMP Media, LLC, Nov. 19, 2002, pp. 1-6.

* cited by examiner

H4 BYTE CONCATENATION MULTIFRAME STRUCTURE

| | BIT 1 | BIT 2 | BIT 3 | BIT 4 | BIT 5 | BIT 6 | BIT 7 | BIT 8 |
|---|---|---|---|---|---|---|---|---|
| | | | | | \multicolumn{4}{l}{1st MULTIFRAME INDICATOR MFI1} | | | |
| 620 | \multicolumn{4}{c}{MFI2 BITS 1-4} | 0 | 0 | 0 | 0 |
| | \multicolumn{4}{c}{MFI2 BITS 5-8} | 0 | 0 | 0 | 1 |
| 630 | \multicolumn{4}{c}{CTRL} | 0 | 0 | 1 | 0 |
| 640 | 0 | 0 | 0 | GID | 0 | 0 | 1 | 1 |
| | \multicolumn{4}{c}{RESERVED} | 0 | 1 | 0 | 0 |
| | \multicolumn{4}{c}{RESERVED} | 0 | 1 | 0 | 1 |
| 650 | \multicolumn{4}{c}{CRC} | 0 | 1 | 1 | 0 |
| | \multicolumn{4}{c}{CRC} | 0 | 1 | 1 | 1 |
| 660 | \multicolumn{4}{c}{MST} | 1 | 0 | 0 | 0 |
| | \multicolumn{4}{c}{MST} | 1 | 0 | 0 | 1 |
| 670 | 0 | 0 | 0 | RSACK | 1 | 0 | 1 | 0 |
| | \multicolumn{4}{c}{RESERVED} | 1 | 0 | 1 | 1 |
| | \multicolumn{4}{c}{RESERVED} | 1 | 1 | 0 | 0 |
| | \multicolumn{4}{c}{RESERVED} | 1 | 1 | 0 | 1 |
| 680 | \multicolumn{4}{c}{SI BITS 1-4} | 1 | 1 | 1 | 0 |
| | \multicolumn{4}{c}{SI BITS 5-8} | 1 | 1 | 1 | 1 |

FIG. 6

METHOD AND APPARATUS FOR ENABLING LCAS-LIKE FEATURE THROUGH EMBEDDED SOFTWARE

BACKGROUND OF THE INVENTION

1. Field of the Invention

The present invention relates to data networks and specifically to adjusting link capacity in an intermediate node contained in a data network.

2. Background Information

The Synchronous Optical Network (SONET) standard is an optical network standard that supports multiplexing on links capable of data rates of hundreds of megabits-per-second (Mbps) or more. SONET provides a single set of multiplexing standards for high-speed links at various rates called Synchronous Transport Signal (STS) or Optical Carrier (OC) levels. The basic transmission rate for SONET is STS-1, which operates at a rate of 51.840 Mbps.

SONET is capable of carrying many signals from different services at various capacities through a synchronous, flexible, optical hierarchy. This is accomplished using a multiplexing scheme that multiplexes services into a synchronous payload envelope (SPE) contained within a base STS-1 signal. Services carried by SONET may include voice, high-speed data and video. In a typical arrangement, service data are mapped into e.g., virtual tributaries (VTs) contained within the SPE. VTs exist at a sub STS-1 level within the SPE and are synchronous signals used to transport lower-speed transmissions, such as Digital Signal Level One (DS-1) data, within the SPE.

The SONET optical hierarchy comprises several layers including a section layer, a line layer and a path layer. The Section layer transports STS frames across a physical medium. Its main functions include framing, scrambling, error monitoring and section maintenance. The line layer transports the payload and overhead associated with the path over the physical medium. The line layer provides synchronization and performs multiplexing for the path layer. The path layer transports services between path terminating equipment (PTE) at the ends of a SONET path. The path layer maps signals associated with services into a format required by the line layer.

Each layer in the SONET optical hierarchy is associated with substantial overhead that allows multiplexing and expanded operations, administration, maintenance and provisioning (OAM&P) capabilities. The section layer contains section overhead information (SOH) that is used for communication between, e.g., adjacent elements in a SONET network, such as optical regenerators. The line layer contains line overhead information (LOH) that is used to, e.g., carry STS signals processed by multiplexers contained in a SONET network. The path layer contains path overhead information (POH) that is carried, e.g., on an end-to-end path between a source end (So) of the path contained at a source PTE and a sink end (Sk) of the path contained at a destination PTE. The POH is typically added to signals when they are mapped into VTs and contains information that includes status information associated with the path as well as VT multiframe information.

A SPE may contain one or more VTs wherein each VT is associated with a circuit used to carry e.g., low-speed signal information along a path from a So of the path to a Sk of the path. Moreover, the SPE may use different types of VTs to carry different types of lower-speed signals. For example, a VT-1.5 type VT may be employed to carry a single DS-1 signal and a VT-6 type VT may be employed to carry a single Digital Signal Level Two (DS-2) signal. Further, concatenation may be used to transport payloads that exceed a standard VT type's capacity. For example, several VT-1.5 type VTs may be concatenated to transport payloads that exceed the standard capacity of a single VT-1.5 type VT.

A protocol that may be used to concatenate multiple VTs (circuits) is the Virtual Concatenation (VCAT) protocol. The VCAT protocol is a management plane-oriented protocol that groups, e.g., VTs in a nonconsecutive manner to create virtual concatenation groups (VCGs). VTs belonging to a VCG are called members of the VCG. VCAT uses a control and management plane to establish and manage a path carrying a VCG between a So and a Sk of a path. In a typical arrangement, the control and management plane is used to establish the path for the VCG, identify members of the VCG and assign the path to each of the members.

A VCG is carried over a logical SONET "link" which is a path between a So and a Sk associated with the VCG. Bandwidth associated with VCGs, and hence the capacity associated with the "link," may be controlled using the Link Capacity Adjustment Scheme (LCAS) protocol. The LCAS protocol enables a VCG's bandwidth to change by e.g., adding or deleting members to and from the VCG in order to increase or decrease the VCG's bandwidth, respectively. For example, the LCAS protocol may be used to to delete a member from a VCG, thereby reducing the amount of bandwidth used by the VCG. Likewise, the LCAS protocol may be used to add a member to a VCG thereby increasing the bandwidth of the VCG. The LCAS protocol is an end-to-end protocol meaning that it is typically implemented at PTE located at the ends of the path, i.e., at the So and Sk of the path.

In many implementations, LCAS support is often provided at the hardware level. Often in these implementations, both the So and Sk of a path must have LCAS-compatible hardware in order to provide "LCAS-like" features and functions. In some data networks, this may require having to replace hardware in the network, which may be costly.

Another problem relates to the availability of hardware that supports LCAS. Assume a vendor provides hardware that supports the LCAS protocol for low speed SONET networks (e.g., a SONET network that operates at a STS-1 rate) but not for high-speed SONET networks (e.g., a SONET network that operates at a STS-192 rate). If an ISP implements high-speed and low-speed SONET networks using the vendor's hardware, the ISP would not be able to provide LCAS support to its customers on the high-speed network. Moreover, even if hardware were available, having to replace existing hardware with new hardware that supports LCAS may create various budgetary issues, as the cost of replacing the hardware may be significant.

SUMMARY OF THE INVENTION

The present invention overcomes the disadvantages of the prior art by providing a technique for controlling the capacity of a virtual concatenation group (VCG) carried on a Synchronous Optical Network (SONET) path of a data network. Efficient control of VCG capacity is provided by emulating aspects of a Link Capacity Adjustment Scheme (LCAS) protocol in software. To that end, the inventive technique employs a hardware poller facility to manage the status and state of the VCG, as well as members belonging to the VCG. The hardware poller illustratively contains one or more VCG state machines (VSMs) and member state machines (MSMs) configured to maintain the status and states of the VCGs and their members.

In the illustrated embodiment, packet overhead (POH) information contained in SONET frames associated with a VCG is monitored for SONET defects and H4 byte corruption. If a SONET defect is reported in a SONET frame associated with a member belonging to the VCG, the member is temporarily removed from the VCG until the defect clears. If an H4 byte of a SONET frame associated with the VCG is corrupt, all members belonging to the VCG are temporarily removed from the VCG until the H4 byte is no longer corrupt.

Illustratively, a member is added to a VCG by generating the member's MSM, placing the MSM in a "normal" state and adding the member to the VCG in accordance with the LCAS protocol. If the member's status changes to indicate "out-of-use" (OOU), the member is temporarily removed from the VCG by indicating a "path defect indicator-path" (PDI-P) condition for the member to a destination end (Sk) of a path carrying the member and the member's MSM transitions to an OOU state. If the member is returned to the "normal" state from the OOU state, the PDI-P condition for the member is cleared. Likewise, if the member's status is changed to "out-of-service" (OOS), the member is temporarily removed from the VCG by indicating a "alarm indication signal-path" (AIS-P) condition for the member to the Sk. If the member is returned to the "normal" state from the OOS state, the AIS-P condition for the member is cleared.

If a SONET failure is detected for the member, the member is temporarily removed from the VCG, the member's MSM transitions to a "do not use" (DNU) SONET state and the member's status changes to DNU SONET. If the defect clears, the member's MSM transitions from the SONET DNU state to the "normal" state and the member's status changes to "normal."

If a virtual concatenation (VCAT) failure is detected for the member, the member is temporarily removed from the VCG, the member's MSM transitions to a DNU VCAT state and all members belonging to the member's VCG are temporarily removed from the VCG. If the VCAT failure condition clears, the members are returned (added) to the VCG and the member's MSM transitions to the "normal" state.

If the statuses of all the members belonging to a VCG indicate "down," (e.g., each to member's MSM is either in an OOU, OOS, DNU SONET or a DNU VCAT state) the VCG's VSM transitions to a "down" state and the VCG's status changes to "down." Likewise, if the H4 byte of any SONET frame associated with a member belonging to the VCG is corrupt, the VSM transitions to the down state and all of the members associated with the VCG are temporarily removed from the VCG. If at least one member's status indicates "up" (e.g., the member is in a "normal" state) and at least one other member has a SONET defect, the VCG's VSM transitions to a "degraded" state. If the status of all the members of the VCG indicates "up" or at least one member is "up," no SONET frames associated with the members report defects and no SONET frames associated with the VCG have a corrupt H4 byte the VCG's VSM transitions to the "normal" state.

Advantageously the inventive technique enables aspects of the LCAS protocol to be supported without requiring the LCAS protocol be implemented at the hardware level.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 6 is a block diagram of a multi-frame H4 byte structure that may be advantageously used with the present invention;

DETAILED DESCRIPTION OF AN ILLUSTRATIVE EMBODIMENT

Figure 1:
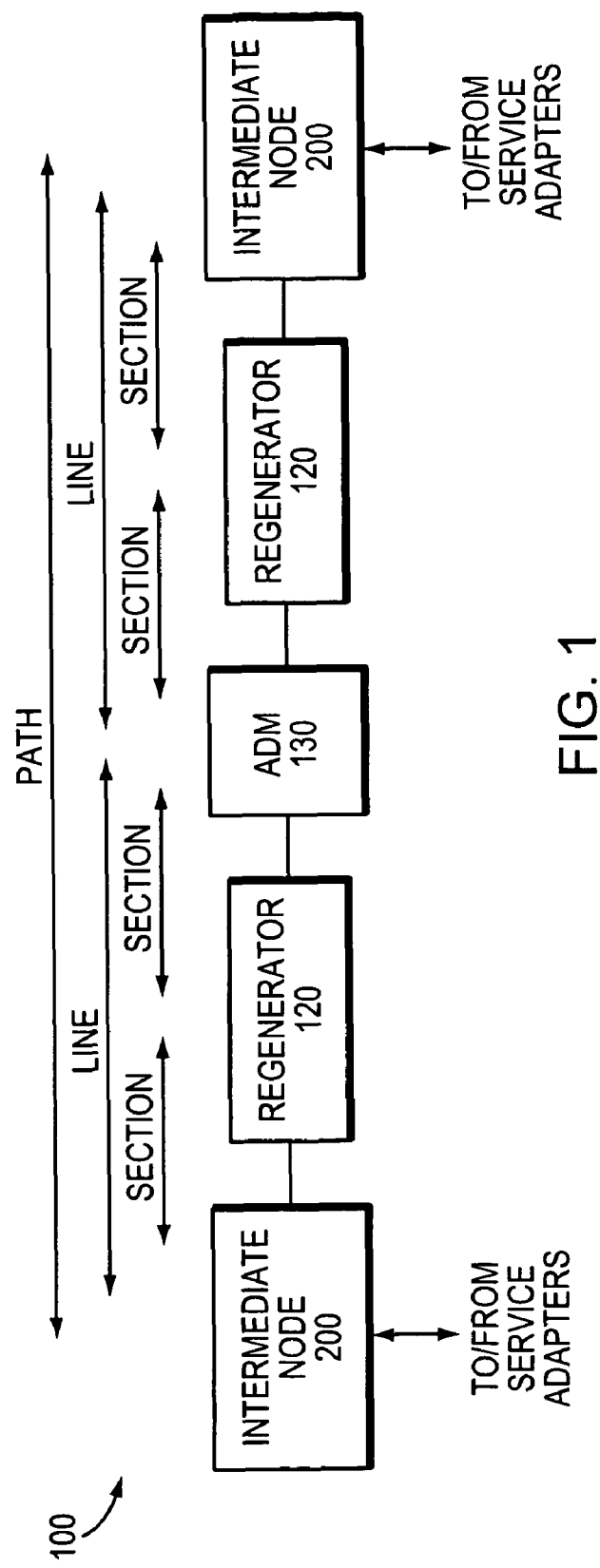
FIG. 1 is a block diagram of an exemplary data network that may be advantageously used with the present invention.

FIG. 1 is a schematic block diagram of an exemplary Synchronous Optical Network (SONET) data network 100 that may be advantageously used with the present invention. Network 100 comprises a collection of nodes interconnected via communication links. The communication links may comprise optical links configured to carry SONET data in a point-to-point manner between the nodes. The SONET data is associated with various optical interface layers including a section layer, line layer and path layer. The optical interface layers have a hierarchical relationship, where each layer builds on services provided by the next lower layer. Each layer communicates to peer equipment at the same layer and processes information that is passed up or down to the next layer.

The intermediate nodes 200 are illustratively path terminating equipment (PTE) of a SONET path where one node is a source intermediate node 200 at the source end (So) of the path and the other node is a destination intermediate node 200 at the destination end (Sk) of the path. Service data, such as Digital Service Level One (DS-1) data, are transferred to the source intermediate node 200 which "maps" the service data onto one or more SONET frames and transfers the SONET frames towards the destination end node 200. Optical regenerators 120 regenerate the SONET frames, and terminate and generate section layer overhead (SOH) also associated with the SONET frames. An add/drop multiplexer (ADM) 130 originates or terminates one or more sections of a line and synchronizes and multiplexes information on the SONET frames. The destination intermediate node 200 terminates the path and removes the service data from the SONET frames and transfers the service data to e.g., an adapter coupled to the destination intermediate node 200.

It should be noted that the illustrated embodiment of the present invention as described herein describes the inventive technique as it may be used with the SONET protocol. It should be understood, however, that other protocols, such as the Synchronous Digital Hierarchy (SDH) protocol, may take advantage of the inventive technique.

Figure 2:
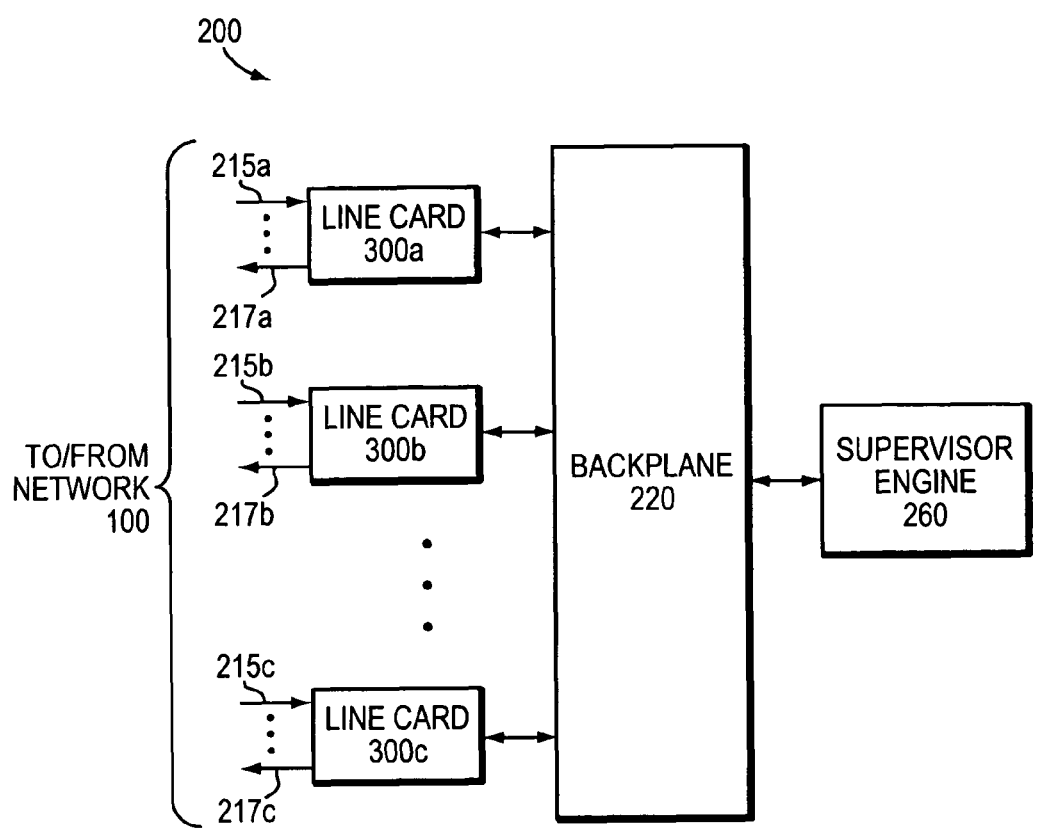
FIG. 2 is a block diagram of an intermediate node that may be advantageously used with the present invention.

FIG. 2 is a high-level schematic block diagram of an exemplary intermediate node 200, which is illustratively a router, that may be advantageously used with the present invention. A suitable intermediate node that may be used with the present invention is the Cisco 7600 Series Routers available from Cisco Systems Incorporated, San Jose, Calif. Intermediate node 200 comprises one or more line cards 300 and a supervisor engine card 260 interconnected by a backplane 220. Node 200 is configured to perform, inter alia, various conventional layer-2 (L2) and layer-3 (L3) switching and routing functions including processing data packets in accordance with the inventive technique. As used herein, L2 and L3 refer to the data-link layer and network layer, respectively, of the Open Systems Interconnection (OSI) reference model. Node 200 is also configured to provide support for various combinations of protocols including, e.g., Open Shortest Path First (OSPF), Intermediate-System-to-Intermediate-System (IS-IS), Multiprotocol Label Switching (MPLS), TCP/IP, Ethernet, Asynchronous Transfer Mode (ATM), multi-channel T3, DS-1, DS-3 and SONET.

The backplane 220 comprises a point-to-point interconnect fabric that interconnects the various cards and allows data and signals to be transferred from one card to another. The supervisor engine 260 comprises logic, such as a central processing unit (not shown) and memory (not shown) that is, inter alia, configured to manage node 200, execute various protocols, such as OSPF, IS-IS, and MPLS, and perform other functions, such as forwarding and routing L2 and L3 data packets.

The line cards 300 connect (interface) the intermediate node 200 with the network 100. The line cards 300 transfer and acquire data packets to and from the network 100 via output ports 217 and input ports 215, respectively, using various protocols such as, SONET, ATM, Ethernet, DS-1 and DS-3. Functionally, the line cards 300 acquire data packets from the network 100 via the input ports 215 and forward the data packets to the backplane 220, as well as transfer data packets acquired from the backplane 220 to the network 100 via the output ports 217. The ports 215, 217 may comprise, e.g., SONET, ATM, DS-1, DS-3, T3, Ethernet, Fast Ethernet (FE) and Gigabit Ethernet (GE) ports.

Figure 3:
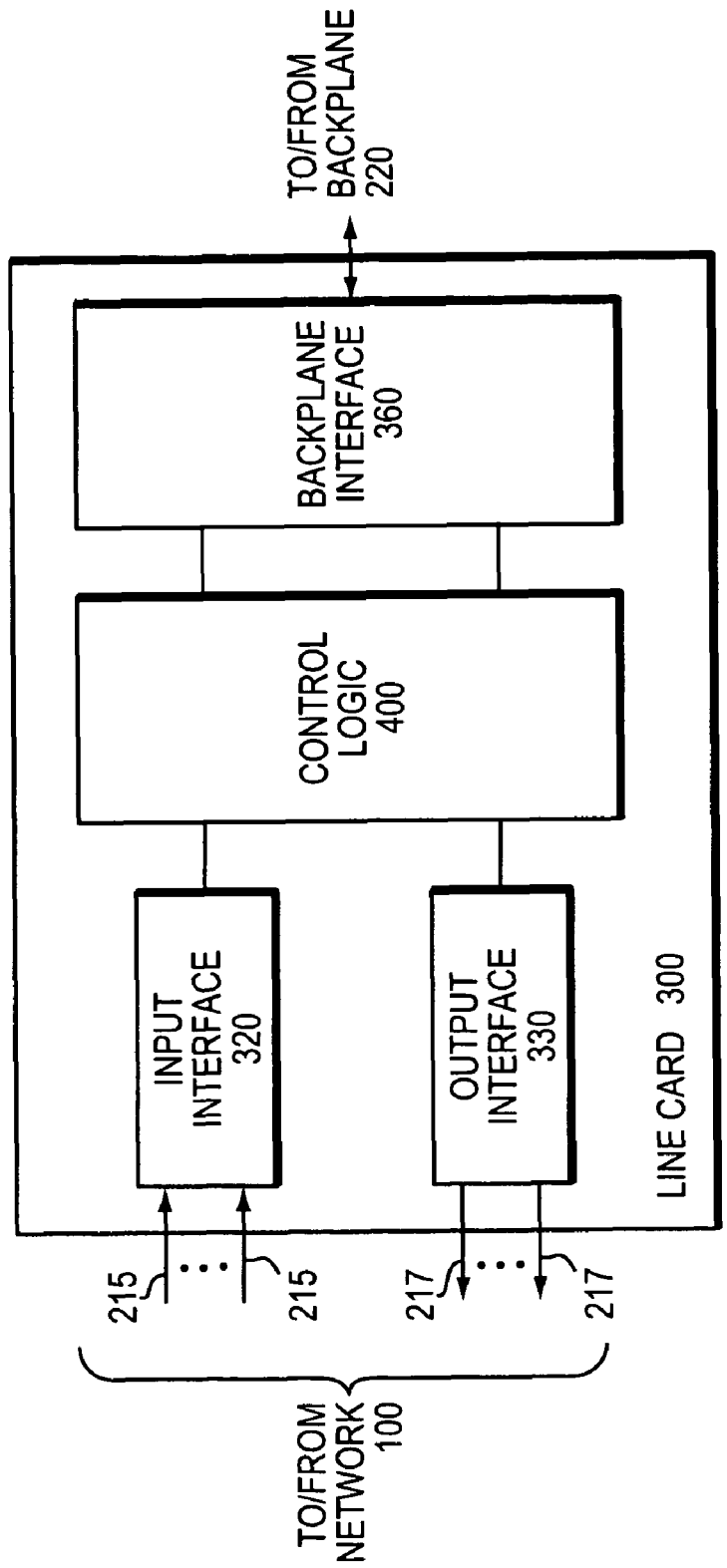
FIG. 3 is a partial block diagram of a line card that may be advantageously used with the present invention.

FIG. 3 is a high-level partial schematic block diagram of a line card 300 that may be advantageously used with the present invention. Line card 300 comprises input interface logic 320, output interface logic 330, backplane interface logic 360 and control logic 400. The output interface logic 330 and input interface logic 320 interface the line card 300 with the network 100 via the output 217 and input 215 ports, respectively, and enable the line card 300 to transfer and acquire data to and from the network 100. To that end, logic 320 and 330 comprise conventional interface circuitry that may incorporate the signal, electrical and mechanical characteristics, and interchange circuits, needed to interface line card 300 with the network's physical media and protocols running over that media. The backplane interface logic 360 contains circuitry that interfaces the line card to the backplane 220 and enables the line card 300 to transfer and acquire data to and from other cards coupled to the backplane 220.

The control logic 400 is configured, inter alia, to emulate aspects of the Link Capacity Adjustment Scheme (LCAS) for Virtual Concatenation Groups (VCG) protocol for the line card 300 in accordance with the inventive technique. The LCAS protocol is well known in the art. The LCAS protocol is described in "Link Capacity Adjustment Scheme (LCAS) for Virtual Concatenated Signals," ITU-T G.7042/Y.1305, available from the International Telecommunication Union (ITU), Geneva, Switzerland and which is hereby incorporated by reference as though fully set forth herein.

Figure 4:
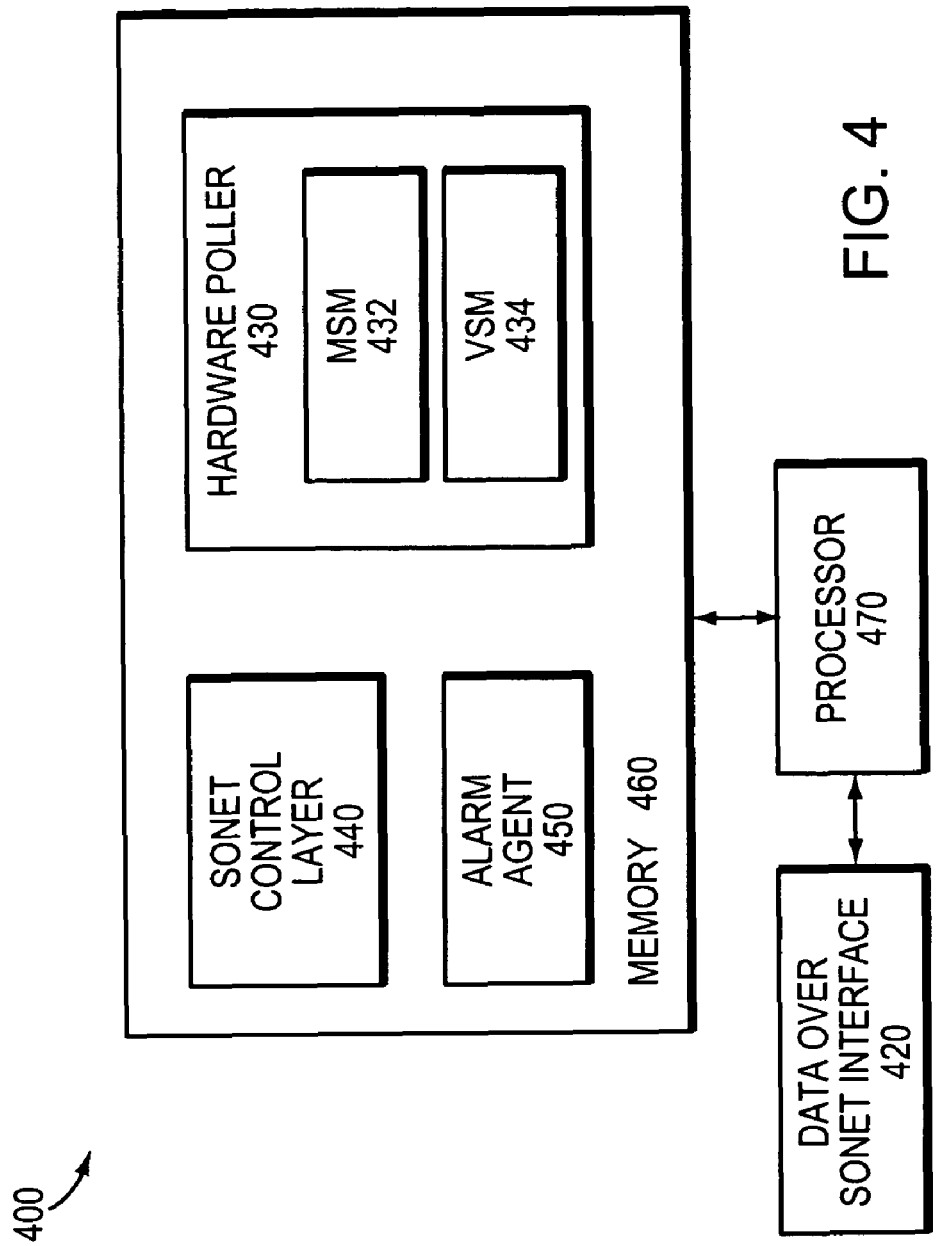
FIG. 4 is a high-level partial schematic block diagram of an interface agent that may be advantageously used with the present invention.

FIG. 4 is a high-level partial schematic block diagram of control logic 400. Logic 400 comprises a processor 470, a data over SONET (DOS) interface 420 and a memory 460. The processor 470 is a conventional central processing unit (CPU) configured to execute instructions contained in, e.g., memory 460. A suitable processor that may be used with the inventive technique is the MPC8260 processor available from Motorola Incorporated, Schaumburg, Ill. The DOS interface 420 is illustratively implemented as a Field Programmable Gate Array (FPGA) configured to multiplex and de-multiplex packets onto and from SONET frames, respectively, as well as detect defects reported in the SONET frames and corrupt information (e.g., bytes) contained in the SONET frames.

The memory is a computer readable medium organized as a random-access memory (RAM) containing memory locations accessible to the processor 470. The memory contains various software including SONET control layer 440, alarm agent 450 and hardware poller 430. The SONET control layer 440, inter alia, provisions members associated with VCGs among e.g., Packet-Over-SONET (POS) ports associated with the intermediate node 200. The alarm agent 450 processes various defects detected by the DOS interface 420 and transfers information associated with the defects to the hardware poller 430. Further, the alarm agent provides an interface that enables other agents (not shown), such as a network management system (NMS), to acquire the state of various defects related to the VCGs and the members belonging to the VCGs. The hardware poller 430 retrieves and processes SONET and virtual concatenation (VCAT) information from the DOS interface 420, SONET control layer 440 and alarm agent 450 and manages, inter alia, the status and state associated with VCGs and members belonging to the VCGs in accordance with the inventive technique. To that end, hardware poller 430 contains member state machine (MSM) 432 and VCG state machine (VSM) 434 that are configured to maintain members and VCGs, respectively.

VSM 434 and MSM 432 are conventional state machines configured to maintain states associated with VCGs and members belonging to the VCGs, respectively, that are contained in intermediate node 200. Illustratively, hardware poller 430 contains a separate instance of VSM 434 for each VCG contained in intermediate node 200. Likewise, illustratively, hardware poller 430 contains a separate instance of MSM 432 for each member of a VCG.

Figure 5:
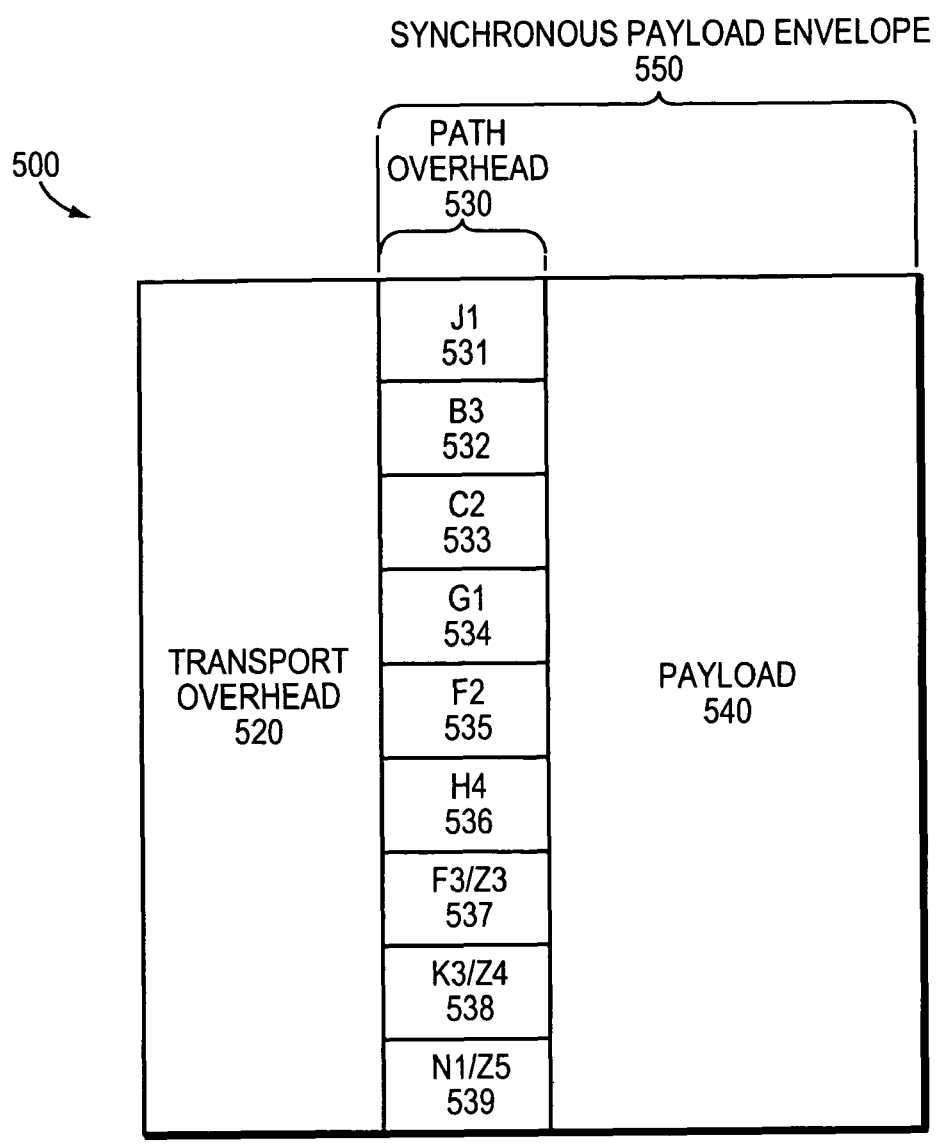
FIG. 5 is a high-level block diagram of a Synchronous Optical Network Synchronous Transport Signal Level One frame structure with overhead bytes that may be advantageously used with the present invention.

According to the method described herein, the controller logic 400 monitors various bytes contained in SONET frames associated with VCGs to determine the statuses and states of the VCGs and their associated members. FIG. 5 is a high-level block diagram of a SONET Synchronous Transport Signal Level One (STS-1) frame 500 that may be used with the present invention. Frame 500 comprises a transport overhead portion 520 and a synchronous payload envelope (SPE) portion 550. The transport overhead portion 520 contains information used to transport the frame 500 through the data network 100. This portion may contain section layer and line layer information used by the section and line layers, respectively, of the SONET optical hierarchy. The SPE 550 contains a payload 540 and path over head (POH) 530 information. The payload 540 contains data transported by the SONET frame.

The POH 530 is associated with each payload 540 and contains information that is used by intermediate nodes 200 at the $S_o$ and $S_k$ of a path. Specifically, the POH contains various bytes that contain information, such as status and indicators, used at the So and Sk of the path. For example, the G1 byte 534 contains status information sent from the Sk to the So to convey status of terminating equipment and path performance. Also, the H4 byte 536 contains multiframe indicator (MFI) information, which provides a generalized multiframe indicator for payload containers. MFI's are typically used when lower rate channels are "packed" into the SPE 540 in, e.g., virtual tributaries (VTs) contained in the SPE 540.

FIG. 6 is a block diagram of an H4-byte MFI structure 600 for LCAS that may be advantageously used with the present invention. Structure 600 illustrates a "concatenation" of H4 bytes 536 for 16 SONET frames. Structure 600 includes a $2^{nd}$ multiframe indicator (MFI2) field 620, a control word (CTRL) field 630, a group identifier field (GID) 640, a cyclic-redundancy check (CRC) field 650, a member status (MST) field 660, a re-sequence acknowledge (RSACK) field 670 and a sequence indicator (SI) field 680. The structure 600 utilizes a $1^{st}$ multiframe indicator field (MFI1) in bits 5-8 of each H4 byte 536 to indicate a sequence count or frame that, in turn, indicates the purpose of the information contained in bits 1-4 of the H4 byte 536. For example, frame 0 of the structure 600 contains bits 1-4 of an MFI2, frame 1 contains bits 5-8 of the MFI2, frame 2 contains a control word, and so on.

The GID field 640 contains a value that identifies a VCG associated with the SONET frames containing the MFI structure 600 and the MST 660 indicates e.g., status associated with members contained in the VCG. The CRC field 650 indicates a cyclic redundancy check of the MFI structure 600, the RSACK field 670 contains a resequencing acknowledgment and the SI field 680 contains a sequence number associated with a member contained in the payload 540.

The CTRL field 630 holds a command that is used, inter alia, to synchronize the Sk with the So of a path and provide status of members of a VCG. Table 1 lists commands that may be used with the present invention.

TABLE 1

COMMANDS

| Command | Remarks |
|---|---|
| FIXED | Fixed bandwidth mode (non-LCAS) |
| ADD | Member is about to be added to the group |
| NORM | Normal transmission |
| EOS | End of sequence and normal transmission |
| IDLE | Member is not part of group or about to be deleted |
| DNU | Do not use (the payload) the Sk side reported a FAIL status |

The present invention relates to a technique for controlling link capacity in an intermediate node. According to the technique, SONET frames associated with a VCG are monitored to determine if, illustratively, H4 bytes contained in the frames are corrupt or a member associated with the VCG has reported a SONET defect. If a member reports a SONET defect, the member's status changes to indicate a SONET "do not use" (DNU) status and the member is removed from the VCG. After the defect clears, the member's status changes to indicate "normal" and the member returns (is added) to the VCG. If SONET frames associated with the VCG are corrupt, the statuses of all members associated with the VCG are set to a "down" state (e.g., set to a DNU virtual concatenation (VCAT) state) and the VCG transitions to a "down" state. If the SONET frames are no longer corrupt, the status of the members associated with the VCG changes to "normal" and the VCG returns to a "normal" state.

In accordance with the present invention, members may be added to and deleted from a VCG. Further, members may be "removed" from a VCG. Members are illustratively added and deleted from a VCG in accordance with the LCAS protocol. A member is considered removed from a VCG when the member's status is "out-of-use" (OOU), "out-of-service" (OOS) or DNU (e.g., DNU SONET, DNU VCAT), as will be further described below.

FIGS. 7A-7D are a flow chart of a sequence of steps that may be used to maintain members of a VCG in accordance with the inventive technique. The sequence begins at Step 705 and proceeds to Step 710 where a member is generated based on, e.g., configuration information associated with the intermediate node 200. Illustratively, generating the member may include allocating and initializing resources associated with the member, such as the member's MSM 432. At Step 720 the member is added to a VCG illustratively in accordance with the LCAS protocol. Specifically, the intermediate node 200 directs the SONET control layer 440 to add the member to the VCG in accordance with the LCAS protocol. After the member has been added, the SONET control layer 440 notifies the hardware poller 430 that the member has been added and in response, the hardware poller 430 transitions the member's MSM 432 to a "normal" state.

At Step 730, a check is performed to determine if the member is to be placed in an OOS state. Illustratively, a member may be placed in an OOS state by a user directing the intermediate node 200 to place the member in the OOS state via e.g., a command-line interface (CLI) or a network management system (NMS) that interfaces with the intermediate node 200. If the member is not to be placed in an OOS state, the sequence proceeds to Step 740. Otherwise the sequence proceeds to Step 731 (FIG. 7B) where the member is placed in an OOS state and member's OOS status is indicated in SONET frames associated with the member (Step 732). Illustratively, the hardware poller 430 places the member in an OOS state by transitioning the member's MSM 432 to an OOS state. Further, illustratively, the DOS interface 420 indicates the member's status as OOS by placing an AIS-P defect indication in the C2 byte 533 of SONET frames associated with the member.

Table 2 (below) lists defects that may be reported in a SONET frame associated with a member or VCG.

TABLE 2

DEFECTS

| Name | Remarks |
|---|---|
| AIS-P | Alarm indication signal - path |
| LOP-P | Loss of path - path |
| RDI-P | Remote defect indicator - path |
| PDI-P | Path defect indicator - path |
| UNEQ-P | Path unequipped code - path |
| PLM-P | Path payload label mismatch - path |
| SPLM-P | Special payload label mismatch - path |
| SQM | Sequence number mismatch |
| LOM | Loss of multiframe |
| TIM-P | Trace identifier mismatch - path |
| SF-P | Signal fail - path |
| SD-P | Signal degrade - path |
| LOA | Loss of alignment |

Figure 7A:
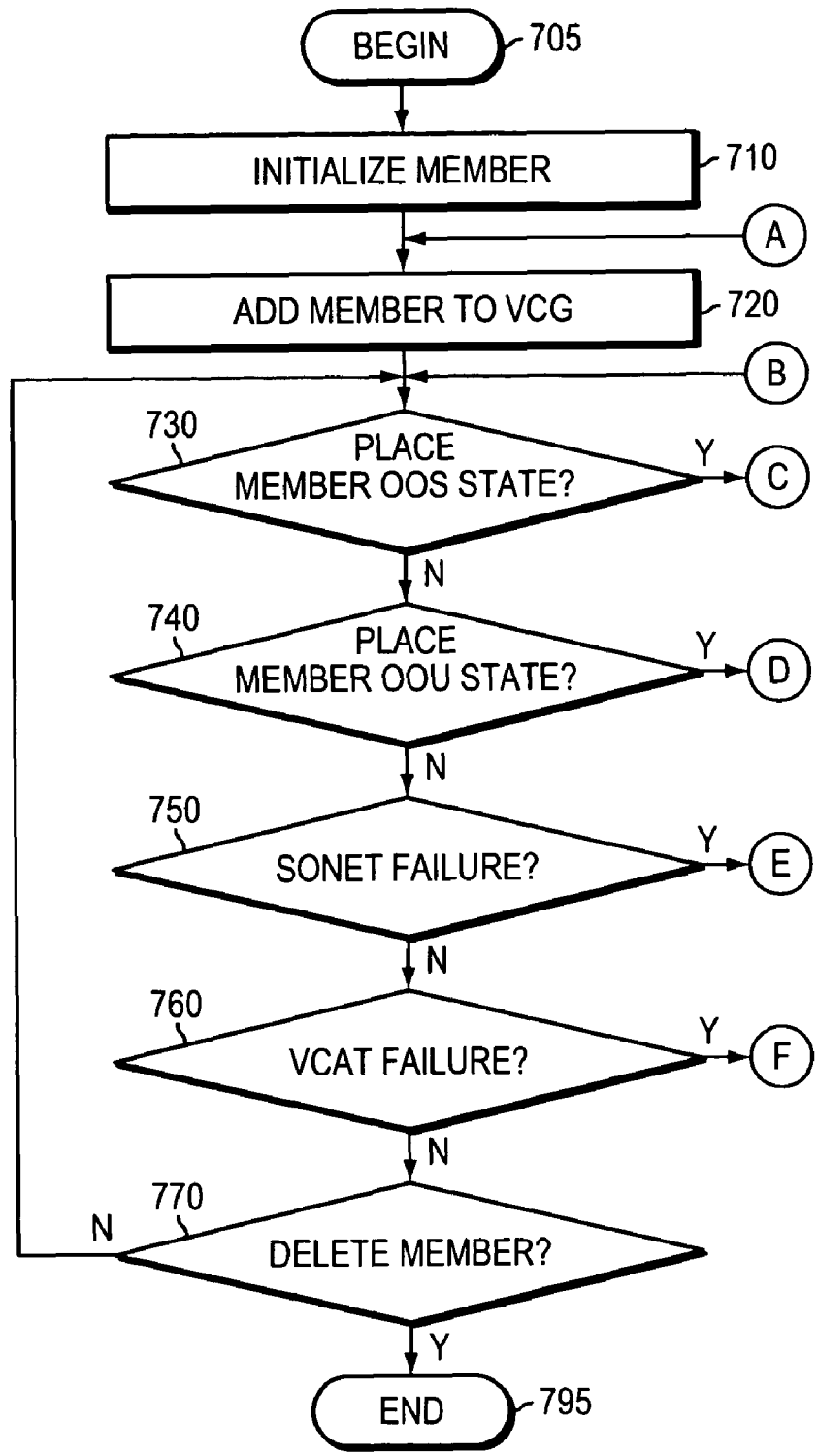
FIGS. 7A-7D are a flow chart of a sequence of steps that may be used to generate and add a member to a virtual concatenation group (VCG) in accordance with the inventive technique.
Figure 7B:
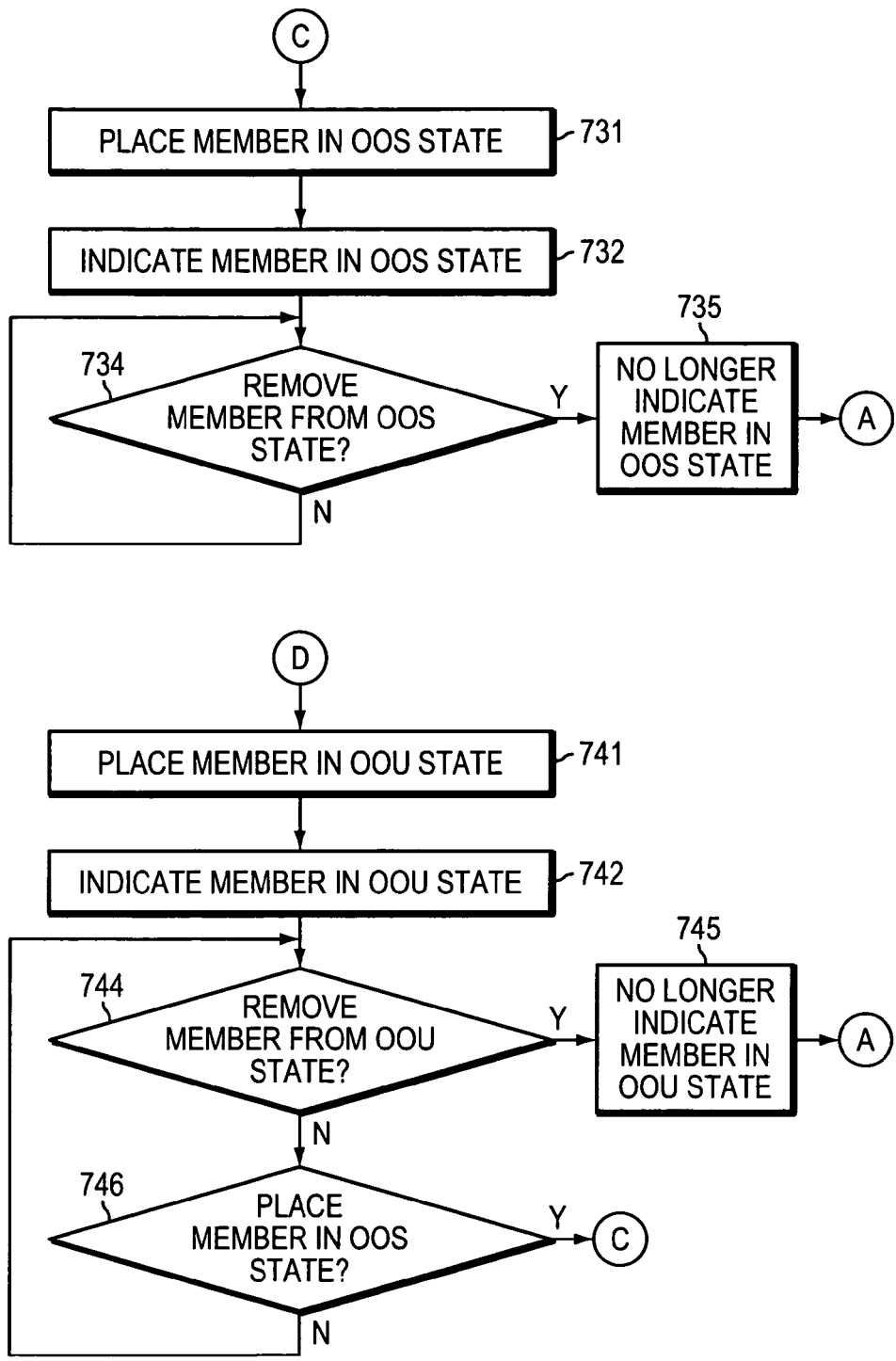
Figure 7C:
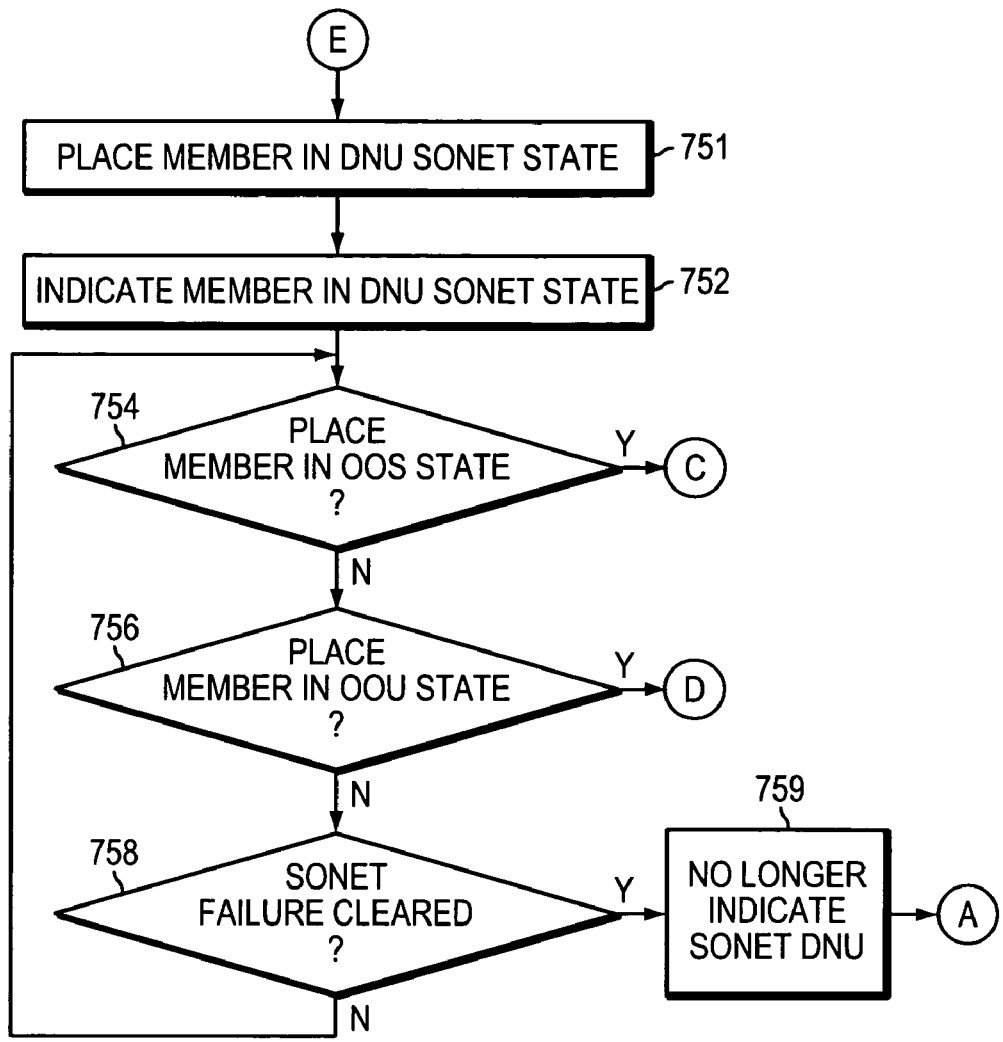
Figure 7D:
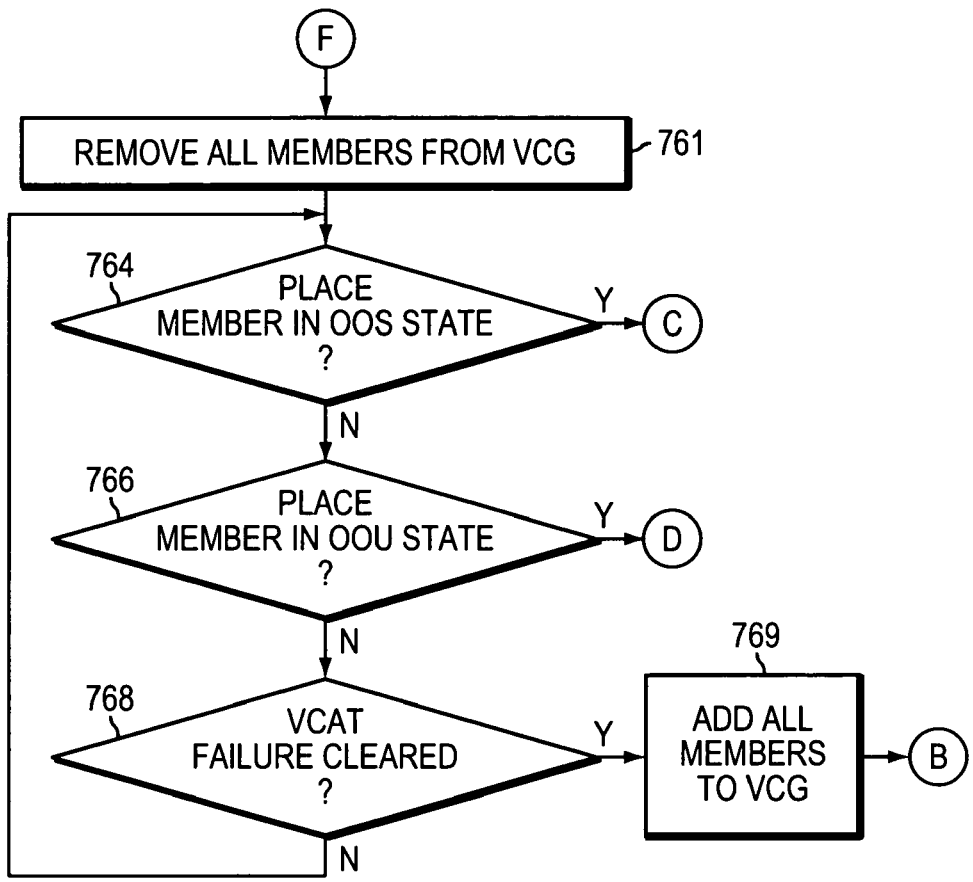

From Step 732, the sequence proceeds to Step 734 where a check is performed to determine if the member is to be removed from the OOS state. Illustratively, a member may be removed from the OOS state by direction of a user via a CLI or NMS interface to the intermediate node 200. If the member is to be removed from the OOS state, the sequence proceeds to Step 735 where, illustratively, frames associated with the member are configured to no longer indicate the member's status as OOS. The sequence then returns to Step 720 (FIG. 7A). If the member is not to be removed from the OOS state, the sequence returns to Step 734.

Returning to FIG. 7A, at Step 740, a check is performed to determine if the member is to be placed in an "out-of-use" (OOU) state. Illustratively, a member may be placed in an OOU state by direction of a user via a CLI or a NMS interface with the intermediate node 200. If the member is not to be placed in an OOU state, the sequence proceeds to Step 750. Otherwise the sequence proceeds to Step 741 (FIG. 7B) where the member is placed in an OOU state and an OOU status is indicated for the member in SONET frames associated with the member (Step 742). Illustratively, the hardware poller 430 transitions the member's MSM 432 to an OOU state and the DOS interface 420 indicates the member's OOU status by placing PDI-P in the C2 bytes 533 of SONET frames associated with the member.

At Step 744, a check is performed to determine if the member should be removed from the OOU state. If so, the sequence proceeds to Step 745 where OOU status is no longer indicated for the member in SONET frames associated with the member. The sequence then returns to Step 720 (FIG. 7A). Otherwise, if the member is not to be removed from the OOU state, the sequence proceeds to Step 746 where a check is performed to determine if the member is to be placed in an OOS state. If so, the proceeds to Step 731; otherwise, the sequence returns to Step 744.

Returning again to FIG. 7A, at Step 750, a check is performed to determine if a SONET failure has been reported in one or more SONET frames associated with the member. Illustratively, an AIS-P or LOP-P error indication in SONET frames associated with the member indicates a SONET failure. Further, illustratively, the DOS interface 420 checks SONET frames associated with the member for a SONET failure and reports any SONET failures to the hardware poller 430. If a SONET failure has not been reported, the sequence proceeds to Step 760.

Otherwise, the sequence proceeds to Step 751 (FIG. 7C) where the hardware poller 430 illustratively places the member's MSM 432 in a "do-not-use" (DNU) SONET state. The member's DNU SONET status is then indicated in SONET frames associated with the member (Step 752). Illustratively, the DOS interface 420 indicates a DNU SONET status for a member by placing RDI-P in the C2 byte 533 of SONET frames associated with the member if the SONET failure reported is an AIS-P or LOP-P error. Otherwise, illustratively, if the SONET failure reported is not AIS-P, LOP-P or PDI-P, the DOS interface 420 indicates a DNU SONET status for a member by placing PDI-P in the C2 byte 533 of SONET frames associated with the member.

Next, at Step 754, a check is performed to determine if the member is to be placed in the OOS state. If so, the sequence proceeds to Step 731. Otherwise, the sequence proceeds to Step 756 where a check is performed to determine if the member is to be placed in the OOU state. If so, the sequence proceeds to Step 741. Otherwise, the sequence proceeds to Step 758 where a check is performed to determine if the SONET failure has cleared. Illustratively, the SONET failure is considered cleared if SONET frames associated with the member no longer report the SONET failure (e.g., AIS-P, LOP-P). If the SONET failure has cleared, the sequence proceeds to Step 759 where the member's DNU SONET status is no longer indicated in SONET frames associated with the member. The sequence then returns to Step 720. Otherwise, if the SONET failure is not cleared, the sequence returns to Step 754.

Returning again to FIG. 7A, at Step 760, a check is performed to determine if a VCAT failure has occurred for the member. Illustratively, a VCAT failure occurs for a member if SONET frames associated with the member contain a corrupt H4 byte. If a VCAT failure has occurred, the sequence proceeds to Step 761 (FIG. 7D) where all the members belonging to the VCG are removed. Illustratively, the members are removed by the hardware poller 430 transitioning the members' MSMs 432 to a DNU VCAT state. Further, the hardware poller 430 illustratively directs the SONET control layer 440 to indicate the members are in the DNU VCAT state by placing PDI-P in the C2 byte 533 of frames associated with the members. Note that, if PDI-P is received in a SONET frame to associated with a member transitioned to the DNU VCAT state, to avoid a "deadlock" situation PDI-P should not be sent in frames associated with the member.

At Step 764, a check is performed to determine if the member is to be placed in the OOS state. If so, the sequence proceeds to Step 731. Otherwise, the sequence proceeds to Step 766 where a check is performed to determine if the member is to be placed in the OOU state. If so, the sequence proceeds to Step 741. Otherwise, the sequence proceeds to Step 768 where a check is performed to determine if the VCAT failure has cleared (e.g., the H4 bytes of frames associated with the member are no longer corrupt). If not, the sequence returns to Step 764. Otherwise, the sequence proceeds to Step 769 where the members belonging to the VCG are added (returned) to the VCG and the sequence returns to Step 730. Illustratively, the hardware poller 430 directs the SONET control layer 440 to no longer indicate PDI-P in the C2 byte 533 of frames associated with the members.

Figure 8:
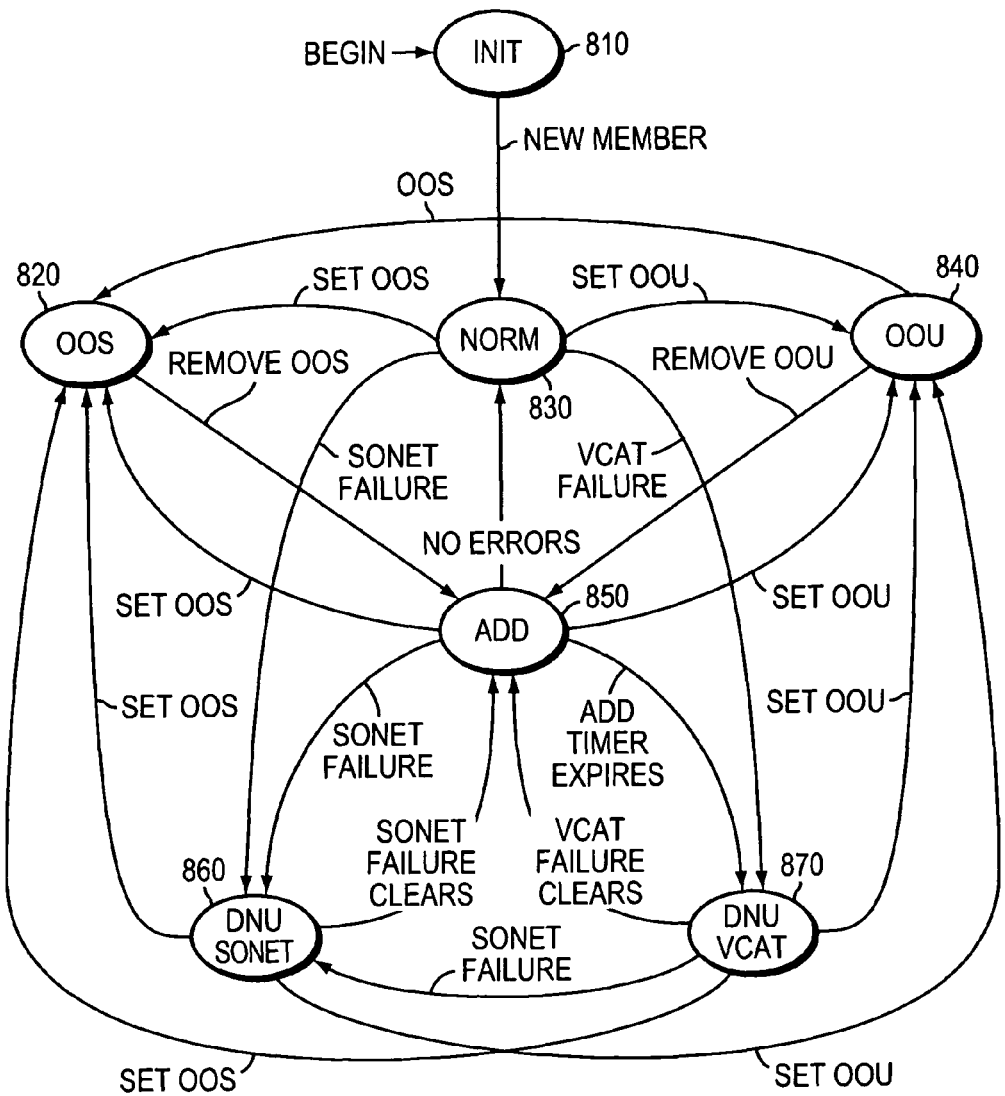
FIG. 8 is a state diagram that may be used to configure a state machine to generate and maintain a member belonging to a VCG in accordance with the inventive technique.

FIG. 8 is a state diagram that may be used to configure a member's MSM 432 to manage the member in accordance with the inventive technique. Illustratively, a member's MSM 432 contains an "initialize" (INIT) state 810, an OOS state 820, a "normal" (NORM) state 830, an OOU state 840, an "add" (ADD) state 850, a DNU SONET state 860 and a DNU VCAT state 870.

The member's MSM 432 begins in the "initialize" state 810 where the member is generated and added to a VCG, as described above. The MSM 432 then transitions to the NORM state 830 where, inter alia, SONET frames associated with the member are monitored for defects. Illustratively, the DOS interface 420 monitors the member's SONET frames and reports defects to the member's MSM 432 including AIS-P, LOP-P, RDI-P, PDI-P, UNEQ-P, PLM-P, SPLM-P, SQM, LOM, LOA TIM-P, SF-P and SD-P type defects.

Also while in the NORM state 830, if the member's status is to be set to OOS, the MSM 432 transitions to the OOS state 820. Likewise, if the member's status is to be set to OOU, the MSM 432 transitions to the OOU state 840. If a SONET failure is reported in SONET frames associated with the member, the MSM 432 transitions to the DNU state 860 and if VCAT failures are reported in frames associated with the member, the MSM 432 transitions to the DNU VCAT state 870.

In the OOU state 840, the member's OOU status is indicated in SONET frames associated with the member, as described above. From the OOU state 840, if the member is to be removed from an OOU status, the MSM 432 transitions to the ADD state 850. If the member's status is to be set to OOS, the MSM 432 transitions to the OOS state 820.

In the OOS state 820, the member's OOS status is indicated in SONET frames associated with the member, as described above. From the OOS state 820, if the member is to be removed from an OOS status, the MSM 432 transitions to the ADD state 850.

The MSM 432 stays in the ADD state for an optional amount of time ("Add Timer"). Illustratively, the optional amount of time comprises two components a "fixed" component that allows time for the DOS interface 420 to synchronize with the SONET signal and a "variable" component that allows a PDI-P indication to reach the far (destination) end of a path associated with the member's VCG. If during the optional amount of time a SONET failure is reported, the MSM 432 transitions to the DNU SONET state 860. Also, if after the optional amount of time ("Add Timer" expires) a VCAT failure is still reported, the member's MSM 432 transitions to the DNU VCAT state 870. If no errors (e.g., SONET failures, VCAT failures) are reported after the optional amount of time, the MSM 432 transitions to the NORM state 830.

Also while in the ADD state 850, if the member's status is to be set to OOS, the state machine transitions to the OOS state 820. Likewise, if the member's status is to be set to OOU, the state machine transitions to the OOU state 840.

In the DNU SONET state 860, the member's DNU status is indicated in SONET frames associated with the member as described above. If the SONET failure clears (i.e., no longer indicated in SONET frames associated with the member), the MSM 432 transitions to the ADD state 850. From the DNU SONET state 860, if the member's status is to be set to OOU, the member's MSM 432 transitions to the OOU state 840. Likewise, if the member's status is to be set to OOS, the member's MSM 432 transitions to the OOS to state 820.

In the DNU VCAT state 870, all members belonging to the VCG are removed from the VCG, as described above. From the DNU VCAT state 870, if the VCAT failure clears (e.g., the H4 byte of SONET frames associated with the member are no longer corrupt), each member's MSM 432 transitions to the ADD state 850. From the DNU VCAT state, 870, if the member's status is to be set to OOU, the member's MSM 432 transitions to the OOU state 840. Likewise, if the member's status is to be set to OOS, the member's MSM 432 transitions to the OOS state.

In accordance with the inventive technique, VCGs may be generated and one or more members may be added to the VCGs. Moreover, VCGs are maintained including monitoring H4 bytes contained in SONET frames associated with the VCG to determine if any of the H4 bytes are defective (corrupt). If an H4 byte is defective, all the members associated with the VCG are removed from the VCG, as described above, and the VCG is placed in a "down" state.

Figure 9:
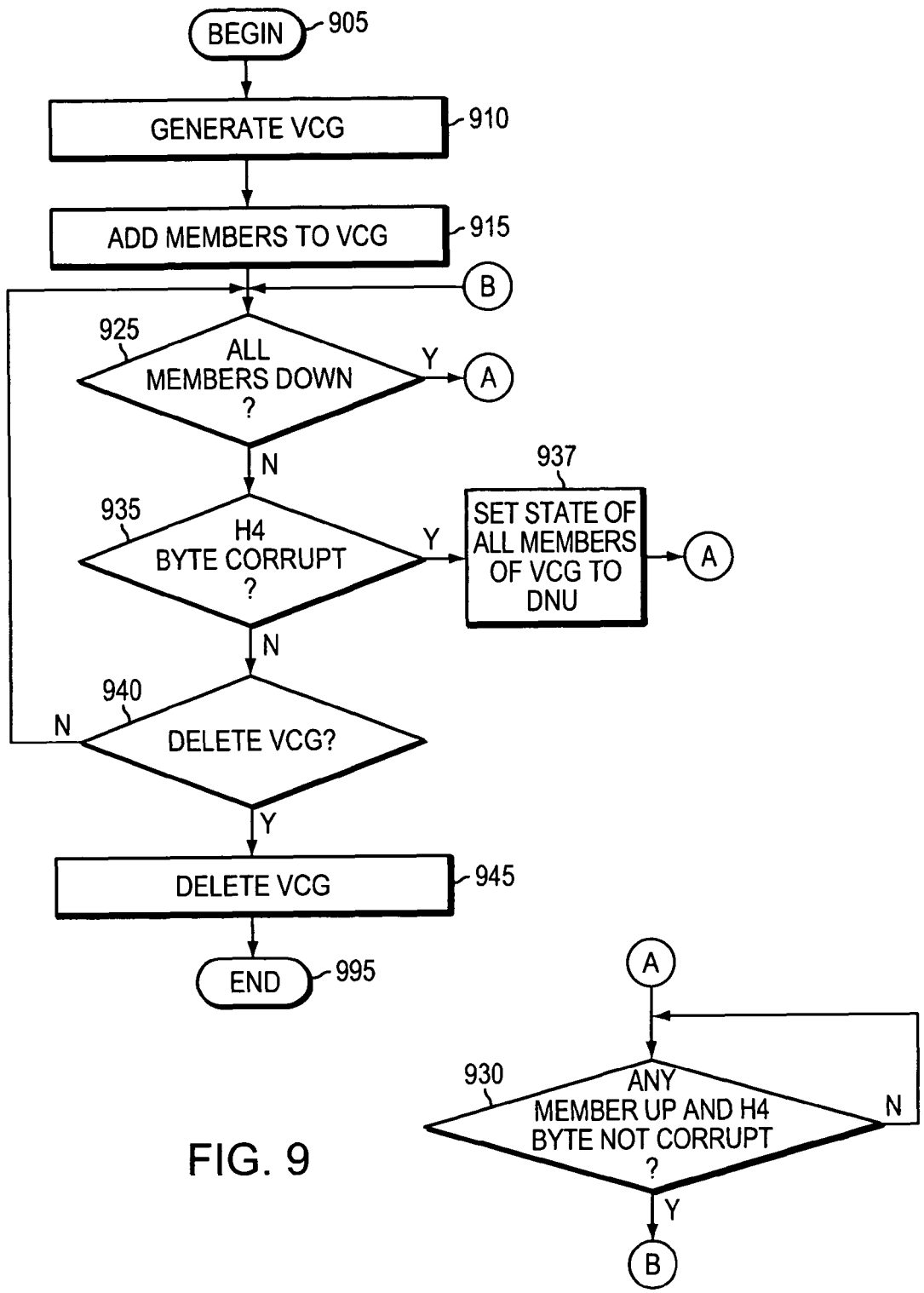
FIG. 9 is a flow diagram of a sequence of steps that may be used to generate and maintain a VCG in accordance with the inventive technique.

FIG. 9 is a flow chart of a sequence of steps that may be used to generate and maintain a VCG in accordance with the inventive technique. The sequence begins at Step 905 and proceeds to Step 910 where the VCG is generated based on, e.g., configuration information associated with an intermediate node 200 hosting the VCG. At Step 915, members are added to the VCG by, e.g., the SONET control layer 440 in accordance with the LCAS protocol.

At Step 925, a check is performed, illustratively by the hardware poller 430, to determine if all the members associated with the VCG are "down" (e.g., each VCG member's MSM 432 is either in an OOU, OOS, DNU SONET or a DNU VCAT state). If so, the sequence proceeds to Step 930 where a check is performed, illustratively by the hardware poller 430, to determine if the status of any member of the VCG is "up" (e.g., the member's MSM 432 is in a NORM state) and the H4 bytes of SONET frames associated with the VCG are not corrupt. If so, the sequence returns to Step 925; otherwise, the sequence returns to Step 930.

If at Step 925 the statuses of all members of the VCG are not "down" (i.e., at least one member is "up"), the sequence proceeds to Step 935 where a check is performed to determine if any SONET frame associated with the VCG is corrupt. Illustratively, the hardware poller 430 determines if the DOS interface 420 has indicated that the H4 byte of any SONET frame associated with the VCG is corrupt. If so, the sequence proceeds to Step 937, where the status of all members belonging to the VCG is set to DNU (e.g., the members' MSMs 432 are transitioned to a DNU VCAT state 870), illustratively by the hardware poller 432, and the sequence returns to Step 930. Otherwise, the sequence proceeds to Step 940 where a check is performed to determine if the VCG is to be deleted. Illustratively, a user directs the intermediate node 200 to delete a VCG via e.g., a CLI or an NMS configured to communicate with the intermediate node 200. If the VCG is not to be deleted, the sequence returns to Step 925. Otherwise, the sequence proceeds to Step 945 where the VCG is deleted. Illustratively, the VCG is deleted by the hardware poller 430 which deletes the VCG by deleting all members from the VCG in accordance with the LCAS protocol and deleting the VCG from the intermediate node 200 (including e.g., freeing data structures associated with the VCG and its members). The sequence then ends at Step 995.

Figure 10:
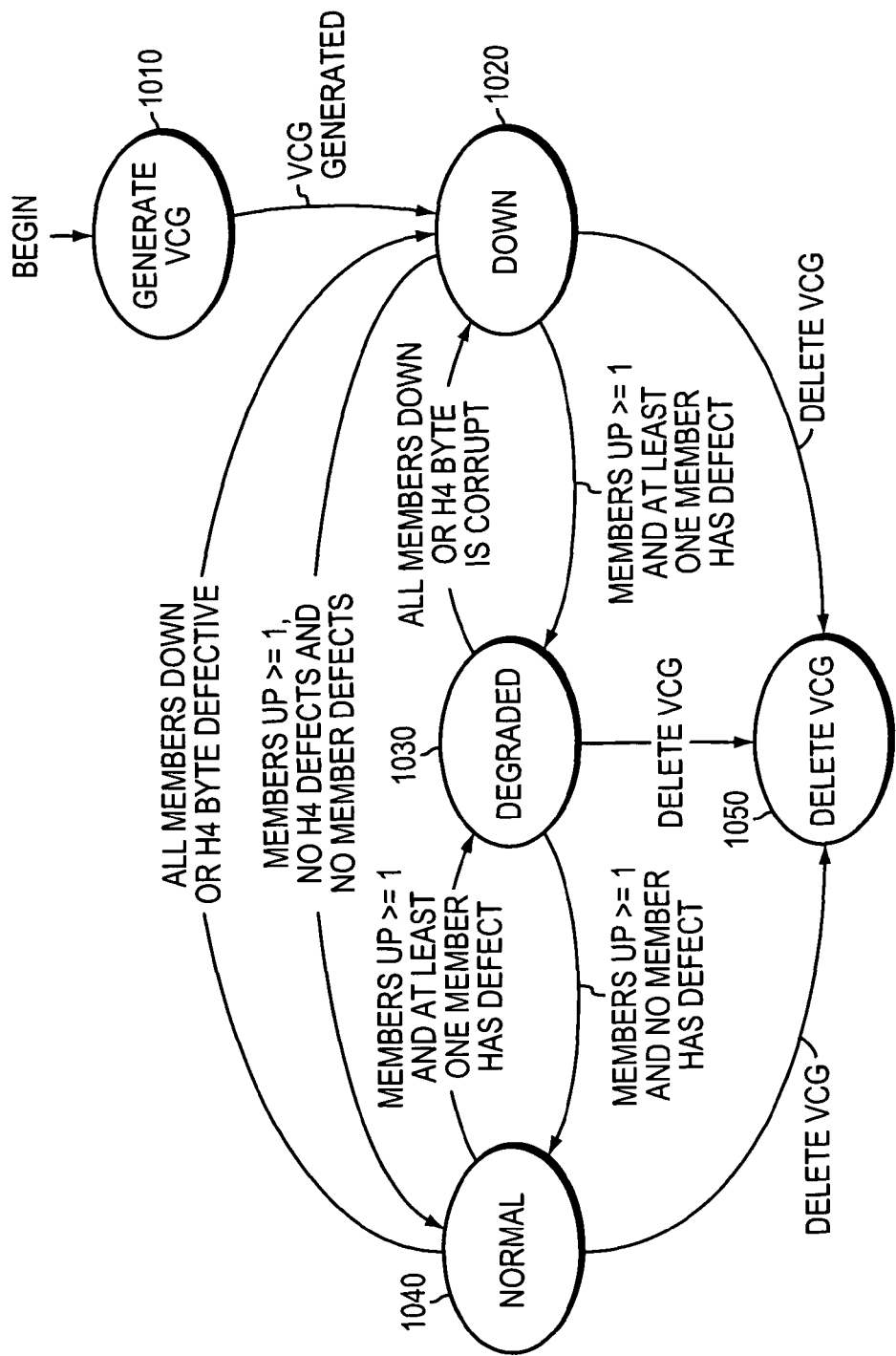
FIG. 10 is a state diagram that may be used to configure a state machine to generate and maintain a VCG in accordance with the inventive technique.

As noted above, VSM 434 (FIG. 4) is a state machine that maintains VCGs. FIG. 10 is a state diagram that may be used to configure VSM 434 to generate and manage VCGs in accordance with the inventive technique. The state diagram contains a "normal" state 1040, "degraded" state 1030, "generate VCG" state 1010, "down" state 1020 and "delete VCG" state 1050. In the "normal" state 1040, at least one member is up, no members are "down" due to defects (e.g., no members are in a DNU SONET state or DNU VCAT state) and SONET frames associated with the VCG are not corrupt (e.g., the H4 byte of a SONET frame associated with the VCG is not corrupt). In the "down" state 1020, the statuses of all the members belonging to the VCG are "down." Also, if SONET frames associated with the VCG are corrupt, the VSM stays in this state. In the "degraded" state 1030, the status of at least one member of the VCG is "down" due to a defect and the status of at least one other member is "up." In the "generate VCG" state 1010, the VCG is generated and resources for the VCG are allocated. In the "delete VCG" state 1050, all members belonging to the VCG are deleted illustratively in accordance with the LCAS protocol and resources allocated for the VCG and members are freed.

The VSM begins in the "generate VCG" state 1010 where resources associated with the VCG are allocated which may include, e.g., allocating and initializing data structures associated with the VCG and initializing the DOS interface 420 to monitor SONET frames associated with the VCG. The VSM then transitions to the "down" state 1020 where members are added to the VCG in accordance with the LCAS protocol. While in the "down" state 1020, if the status of at least one member associated with the VCG is "up" and the status of at least one other member is "down" due to a defect, the VSM transitions from the "down" state 1020 to the "degraded" state 1030. Also while in the "down" state 1020, if the status of at least one member is "up" and SONET frames associated with the VCG are not corrupt (e.g., a H4 byte of a SONET frame associated with the VCG is not corrupt), the VSM transitions from the "down" state 1020 to the "normal" state 1040.

From the "degraded" state 1030, if the statuses of all members are "up," the VSM transitions from the "degraded" state 1030 to the "normal" state 1040. Also, from the "degraded" state 1030, if the VCG is deleted, e.g., by a user directing the intermediate node 200 to delete the VCG via a CLI or NMS, the VSM transitions to the "delete VCG" state 1050. Further, from the "degraded" state 1030, if any SONET frame associated with the VCG is corrupt, the VSM transitions to the "down" state 1020.

In the "normal" state 1040, if a SONET frame associated with the VCG is corrupt (e.g., a H4 byte in a SONET frame associate with the VCG is corrupt), the VSM transitions from the "normal" state 1040 to the "down" state 1020. Also, if the VCG is to be deleted, the VSM transitions from the "normal" state 1040 to the "delete VCG" state 1050.

In the "delete VCG" state 1050, members from the VCG are deleted from the VCG illustratively in accordance with the LCAS protocol, resources allocated to the VCG and members are freed and the VCG is deleted.

The above-described embodiment of the invention describes the invention as it may be used with high-order virtual concatenation. However, it should be noted that the inventive technique may be used with low-order virtual concatenation.

It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. A method for controlling capacity associated with a virtual concatenation group (VCG) comprising the steps of:
   adding a plurality of member virtual tributaries (VTs) to the VCG by an intermediate node whose hardware does not support Link Capacity Adjustment Scheme (LCAS) protocol running at hardware level on the hardware;
   retrieving, by software at the intermediate node, Synchronous Optical Network (SONET) and virtual concatenation (VCAT) information from the hardware in the intermediate node;
   determining in software at the intermediate node if a SONET frame associated with a member VT added to the VCG indicates a SONET defect;
   if the SONET frame associated with the member VT added to the VCG indicates a SONET defect, removing the member VT from the VCG until the SONET defect clears;
   determining in software at the intermediate node if a SONET frame associated with the VCG has an H4 byte that is corrupt; and
   if the SONET frame associated with the VCG has an H4 byte that is corrupt, removing all of the plurality of added member VTs from the VCG and placing the VCG in a down state until H4 byte corruption clears.

2. The method as defined in claim 1 comprising the steps of:
   determining if all the member VTs added to the VCG are down; and
   if so, placing the VCG in a down state.

3. The method as defined in claim 1 comprising the steps of:
   determining if a first member VT added to the VCG is up and a SONET frame associated with a second member VT added to the VCG indicates a SONET defect; and
   if so, placing the VCG in a degraded state.

4. The method as defined in claim 1 comprising the steps of:
   determining if at least one member VT added to the VCG is up and SONET frames associated with the VCG are not corrupt; and
   if so, placing the VCG in a normal state.

5. The method as defined in claim 1 comprising the steps of:
   if the SONET frame associated with the member VT added to the VCG indicates a SONET defect, placing the member VT in a do not use (DNU) SONET state.

6. The method as defined in claim 5 comprising the steps of:
   determining if a SONET frame associated with the member VT added to the VCG does not indicate a SONET defect; and
   if so, placing the member VT in a normal state.

7. The method as defined in claim 1 comprising the steps of:
   determining if a member VT is to be set in an out of use (OOU) state; and
   if so, placing the member VT in an OOU state.

8. The method as defined in claim 1 comprising the steps of:
   determining if a member VT is to be removed from an OOU state; and
   if so, adding the member VT to the VCG.

9. An intermediate node that utilizes a virtual concatenation group (VCG) that includes a plurality of member virtual tributaries (VTs), the intermediate node comprising:
   a processor configured to emulate the Link Capacity Adjustment Scheme (LCAS) protocol in software, the processor further configured to determine in software if a Synchronous Optical Network (SONET) frame associated with a member VT of the VCG indicates a SONET defect, and, if so, remove the member VT from the VCG until the SONET defect clears, and to determine in software if a SONET frame associated with the VCG has an H4 byte that is corrupt, and, if so, remove all of the plurality member VTs from the VCG and place the VCG in a down state until H4 byte corruption clears,
   wherein LCAS-compatible hardware that supports running LCAS running at hardware level is not available in the intermediate node.

10. The intermediate node as defined in claim 9 comprising:
    wherein the processor is further configured to add one or more member VTs to the VCG.

11. The intermediate node as defined in claim 10 wherein the processor is configured to:
    determine if all the member VTs added to a VCG are down; and
    if so, place the VCG in a down state.

12. The intermediate node as defined in claim 10 wherein the processor is configured to:
    determine if a first member VT added to the VCG is up and a SONET frame associated with a second member VT added to the VCG indicates a SONET defect; and
    if so, place the VCG in a degraded state.

13. The intermediate node as defined in claim 10 wherein the processor is configured to:
    determine if a member VT added to the VCG is up and SONET frames associated with the VCG are not corrupt; and
    if so, place the VCG in a normal state.

14. The intermediate node as defined in claim 10 wherein, if the SONET frame associated with the member VT added to the VCG indicates a SONET defect, place the member VT in a do not use state.

15. The intermediate node as defined in claim 10 wherein the processor is configured to:
- determine if a SONET frame associated with the member VT added to the VCG does not indicate a SONET defect; and
- if so, place the member VT in a normal state.

16. The intermediate node as defined in claim 10 wherein the processor is configured to:
- determine if a member VT is to be set in an out of use (OOU) state; and
- if so, place the member VT in an OOU state.

17. The intermediate node as defined in claim 10 wherein the processor is configured to:
- determine if a member VT is to be set in use; and
- if so, place the member VT in a normal state.

18. An apparatus that utilizes a virtual concatenation group (VCG) that includes a plurality of member virtual tributaries (VTs), the apparatus comprising:
- a memory configured to store a virtual concatenation group state machine (VSM) associated with the VCG wherein the VSM comprises a normal state and a down state; and
- a processor configured to execute software to:
  - monitor Synchronous Optical Network (SONET) frames associated with member VT associated with the VCG to determine if a frame associated with a member VCG indicates a SONET defect,
  - remove the member VT from the VCG until the SONET defect clears,
  - monitor SONET frames associated with the VCG to determine if an H4 byte of the frames is corrupt, and
  - transition the VSM from the normal state to the down state for the VCG if a SONET frame associated with the VCG has an H4 byte that is corrupt, until H4 byte corruption clears,
- wherein the apparatus does not support Link Capacity Adjustment Scheme (LCAS) protocol running at hardware level on hardware of the apparatus.

19. An apparatus for controlling capacity of one or more data links in a data network, the apparatus comprising:
- means for generating a virtual concatenation group (VCG);
- means for generating a plurality of member virtual tributaries (VTs);
- means for adding the plurality of member VTs to the VCG;
- means for determining in software at the apparatus if a Synchronous Optical Network (SONET) frame associated with a member VT added to the VCG indicates a SONET defect;
- means for removing the member VT from the VCG until the SONET defect clears, if the SONET frame associated with the member VT added to the VCG indicates a SONET defect;
- means for determining in software at the apparatus if a Synchronous Optical Network (SONET) frame associated with the VCG has an H4 byte that is corrupt; and
- means for removing all the plurality of added member VTs from the VCG and placing the VCG in a down state if a SONET frame associated with the VCG has an H4 byte that is corrupt, until H4 byte corruption clears,
- wherein the apparatus does not support Link Capacity Adjustment Scheme (LCAS) protocol running at hardware level on hardware of the apparatus.

20. A non-transitory computer readable storage medium containing computer executable instructions for:
- adding a plurality of member virtual tributaries (VTs) to a virtual concatenation group (VCG);
- determining in software if a Synchronous Optical Network (SONET) frame associated with a member VT added to the VCG indicates a SONET defect;
- removing the member VT from the VCG until the SONET defect clears, if the SONET frame associated with the member VT added to the VCG indicates a SONET defect;
- determining in software if a Synchronous Optical Network (SONET) frame associated with the VCG has an H4 byte that is corrupt; and
- if so, removing all the plurality of added member VTs from the VCG and placing the VCG in a down state until H4 byte corruption clears.

* * * * *

UNITED STATES PATENT AND TRADEMARK OFFICE
CERTIFICATE OF CORRECTION

| | | |
|---|---|---|
| PATENT NO. | : 8,014,296 B1 | Page 1 of 1 |
| APPLICATION NO. | : 10/814878 | |
| DATED | : September 6, 2011 | |
| INVENTOR(S) | : David E. Chisholm | |

It is certified that error appears in the above-identified patent and that said Letters Patent is hereby corrected as shown below:

Col. 2, line 26 should read: "example, the LCAS protocol may be used to ~~to~~ delete a"

Col. 3, line 42 should read: "indicate "down," (e.g., each ~~to~~ member's MSM is either in an"

Col. 11, line 32 should read: "member's MSM 432 transitions to the OOS ~~to~~ state 820."

Signed and Sealed this
First Day of May, 2012

David J. Kappos
*Director of the United States Patent and Trademark Office*